United States Patent
Kugibe

(10) Patent No.: US 8,544,287 B1
(45) Date of Patent: Oct. 1, 2013

(54) SYSTEM AND METHOD FOR RECYCLING NON-REUSABLE REFRIGERANT CONTAINERS

(75) Inventor: Kevin Kugibe, New City, NY (US)

(73) Assignee: Hudson Technologies, Inc., Pearl River, NY (US)

( * ) Notice: Subject to any disclaimer, the term of this patent is extended or adjusted under 35 U.S.C. 154(b) by 0 days.

(21) Appl. No.: 13/532,929

(22) Filed: Jun. 26, 2012

Related U.S. Application Data

(63) Continuation of application No. 12/251,385, filed on Oct. 14, 2008, now Pat. No. 8,205,462.

(60) Provisional application No. 60/979,840, filed on Oct. 14, 2007.

(51) Int. Cl.
F25B 45/00 (2006.01)

(52) U.S. Cl.
USPC ............................................................ 62/149

(58) Field of Classification Search
USPC .............................................. 62/77, 149, 292
See application file for complete search history.

(56) References Cited

U.S. PATENT DOCUMENTS

| | | | | |
|---|---|---|---|---|
| 5,987,770 | A | * | 11/1999 | Hino ................................. 34/92 |
| 6,141,977 | A | * | 11/2000 | Zugibe ........................... 62/149 |

* cited by examiner

*Primary Examiner* — Melvin Jones
(74) *Attorney, Agent, or Firm* — Steven M. Hoffberg; Ostrolenk Faber LLP

(57) ABSTRACT

A system and method for recycling non-reusable refrigerant transport containers. At least one intact refrigerant transport container is received into a sealed chamber. The refrigerant transport container is punctured to release residual refrigerant, which is removed and compressed. The container is shredded and/or compacted. A refrigerant transport container deposit program is provided, comprising: encoding a deposit container prior to use; receiving the encoded spent container and releasing the imposed deposit; automatically removing residual refrigerant from the spent container; and recycling materials from the refrigerant transport container. A database storing a record relating to the encoded refrigerant transport containers may be employed for tracking.

20 Claims, 2 Drawing Sheets

SYSTEM AND METHOD FOR RECYCLING NON-REUSABLE REFRIGERANT CONTAINERS

CROSS REFERENCE TO RELATED APPLICATIONS

The present application is a Continuation of U.S. patent application Ser. No. 12/251,385, filed Oct. 14, 2008, now U.S. Pat. No. 8,205,462, issued Jun. 26, 2012, which claims benefit of priority from U.S. Provisional Patent Application Ser. No. 60/979,840, filed Oct. 14, 2007, the entirety of which is expressly incorporated herein by reference.

FIELD OF THE INVENTION

The present invention relates to material recycling devices, and methods of use therefore.

BACKGROUND OF THE INVENTION

In 2006, the U.S. Environmental Protection Agency commissioned the Universal Technical Institute in Avondale, Ariz. to conduct tests to determine the amount of refrigerant remaining in do-it-yourself (DIY) small cans and professional 30 pound cylinders used to charge motor vehicle air conditioning (MVAC) systems. See, "Disposable Container Heel Testing Study Report", Prepared for: United States Environmental Protection Agency Stratospheric Protection Division, Task Order No. 11, Contract No. EP-W-06-010 (Mar. 21, 2007), and peer review report, each of which is expressly incorporated herein by reference.

Under typical situations, any refrigerant remaining in disposable containers after charging a MVAC system is ultimately eventually released to the atmosphere. The releases are referred to as "heel emissions." For small cans, the tests analyzed the heel remaining after various charging times under different scenarios. The tests of 30 pound cylinders quantified the heel remaining in cylinders that had been removed from service as "empty."

Current MVAC systems use HFC-134a (1,1,1,2 Tetrafluoroethane) refrigerant. MVAC refrigerant emissions can come from leaks in the system, from servicing, and from end-of-life disposal. Servicing emissions can occur either at professional repair shops or through do-it-yourself (DIY) servicing. Repair shops generally use 30 pound cylinders and refrigerant recovery/recycling machines that minimize emissions. Do-it-yourselfers (DIYers) use small cans (typically 12 ounces) of refrigerant to recharge or top off an MVAC without the aid of certified service equipment.

Tests of 30 pound cylinder heels measured the amount of refrigerant remaining in the cylinder after a service shop had determined it was empty and had removed it from the charging equipment. The technicians conducted the tests at standard room temperatures. They weighed each cylinder before recovery of the cylinder contents, and measured and recorded the initial cylinder pressure. With the recovery/recycling machine, they performed two recovery cycles on each cylinder and measured the cylinder weights after each recovery cycle. The technicians pulled a vacuum (10 to 15 in. Hg) during the first recovery cycle. The recovery was completed after the pressure stabilized. They used a different procedure during the second recovery cycle to examine the effects of pulling a deeper vacuum (30 in. Hg). They also applied a heat blanket during the second recovery and oriented the cylinders upside down to transfer the refrigerant in the liquid phase.

The heel testing results for each of six 30 pound cylinders show that the average heel was 1.85%, with a range from 0.302 to 4.46%. This means that an average of 0.55 pounds, and a range of 0.09-1.39 pounds remain in the cylinder after exhaustion in the field.

Similar 30 pound cylinders are used in other industries, and various refrigerant gasses are transported in similar containers. However, the issue of residual gas remaining in the cylinder after use remains apparent in all such cases.

The cylinders are generally single use because reuse would require determination of contaminant status and DOT container certification status, possible inspection and retesting, and significant logistical overhead in returning the containers to refilling plants. On the other hand, non-reusable containers are "virgin", and are efficiently manufactured from steel, tested, filled and distributed. Of course, the exhausted containers end up in landfills, eventually leaking their residual content.

SUMMARY OF THE INVENTION

The present invention provide systems and methods for efficiently recycling single use refrigerant transport containers, while avoiding environmental release of their residual content. Two basic embodiments are provided: a first embodiment wherein containers and their contents are recycled and/or reclaimed in bulk, and a second embodiment which recycles one container at a time.

The present invention also provides a system and method for administering a deposit/refund program for incentivizing recycling of the non-reusable refrigerant transport and distribution containers for service use.

The first embodiment of the invention provides a sealed dual chamber system, with a shredder and two separate vacuum systems.

In operation, one or more spent refrigerant containers are fed into an upper chamber, above a shredder unit, and the access door closed and sealed. A vacuum pump is then operated to fully evacuate the air from within the chamber and it's communicating spaces. For example, a vacuum is drawn to 30 inches of mercury, leaving very little residual non-condensing gasses. The shredder unit is then operated, with the refrigerant containers gravity fed downward. The first action of the shredder is to puncture the refrigerant container, and thus permit access to the residual content within the container. The shredder then continues to shred the steel container, with the shredded steel dropping to a lower chamber. This process can continue continuously until all containers are punctured and then shredded. While the size of this unit is arbitrary, the upper chamber may, for example, hold ten refrigerant containers. It is useful to have the upper chamber as full as possible, since remaining dead space would have to be evacuated in the initial pump down phase.

After the pump down and removal of non-condensing gasses, and concurrently or subsequent with the shredding, a second compressor is operated to withdraw and recycle the refrigerant released into the chamber. The compressor may be operated for example to draw down to 29 inches of mercury.

Since there is no air in the chamber, even if the refrigerant is a flammable type, there is little or no risk of explosion. Likewise, the chamber itself may be designed to be explosion-proof.

When the containers are all shredded, and the refrigerant fully withdrawn from the space, the upper and/or lower chamber may be opened, to insert additional containers and remove the shredded steel in the base.

It is often useful to ensure that the refrigerant gasses collected during a pooling operation, such as would occur with multiple container recycling, are of a single type, since mixed gas requires significant processing. Therefore, it is preferred that the containers entering the recycling system during a single operation all are of the same type. Fortunately, the industry has adopted a color code for the containers, so that it is readily possible to stipulate a manual process which ensures that the containers inserted all are of the same type. An automated system having an automated control 1 may also be implemented to inspect the color of the containers entering the system. While not presently implemented as an industry standard, a bar code may be placed on the various containers, which will permit identification and tracking of encoded refrigerant transport containers 7, which will be discussed in more detail below. The bar code may be automatically read by an automated bar code reader 2, or manually scanned, as the containers are inserted into the device.

When recycling refrigerants, they should be maintained separately. For example, each complete cycle of the system may transfer the contents of the recycled containers to a single receiving vessel, which can then be analyzed and recovered later, for example at a central facility. On the other hand, the system may also employ a real time analyzer 3, for example having an infrared optical sensor 4, to determine the type of gas and purity as it is being withdrawn from the system. If the gas is determined to be pure, and of a single type, it may be routed to a collection vessel predesignated or designated at that time for that type. If it is impure, it may be routed to a separate vessel or vessels.

The collection vessels may be, for example, reusable or disposable containers, which may then be themselves recycled.

The second embodiment of the invention is similar in concept to the first; however it is intended for individual recycling of containers, one at a time. This embodiment may also be useful for recycling small, e.g., 12 oz. containers. Small retail containers tend to have UPC bar codes, which may assist in identification and optimal recycling.

In this case, an individual container is inserted into a chamber, which will generally be cylindrical or conform to the envelope of the container. A hatch is closed and sealed, and the vacuum pump exhausts gas from the chamber, to, e.g., a 30 inch Hg vacuum. The cylinder is then punctured, for example with a lance, to allow release of the contents to the exterior space. The compressor is then operated to remove residual refrigerant, for example down to a 29 inch Hg vacuum. The steel container may then be shredded, either under vacuum, potentially concurrently with the operation of the compressor, or in a separate operation. Indeed, the container may be separately shredded after removal of refrigerant, in a separate operation. Advantageously, the system does not require a manual transfer step, and therefore it is shredded in place. However, in this embodiment, it is not necessary that the shredder components be present in the vacuum space; that is, the vacuum pump and compressor operations may be conducted on the container in the intact, and punctured states respectively, and then the shredder components may be exposed to complete the process. Since this embodiment will generally be compact, for example refrigerator sized (6-8 ft tall, 3-5 feet wide, 3-5 feet deep), and the vacuum and compressor operations will require some time to complete, the shredder may be a relatively slow processor. For example, a sliding door may be placed below the container, such that after completion of refrigerant removal, the container is permitted to drop to a low chamber, where the shredding takes place while the upper chamber is made available for a subsequent refrigerant removal operation.

The vacuum pump and compressor are of known type to persons of ordinary skill in the art. The shredder may be, for example, of a moving blade type used in steel sheet recycling operations, though adapted to fit within the confines of the system as described. In place of the shredder, a crusher may also be employed, as may be appropriate.

Various components and methods may also be adopted from U.S. Pat. No. 6,141,977, expressly incorporated herein by reference.

In order to incentivize return of containers, a deposit system is proposed. Because the point of supply may be different than the point of return, the proposed system employs electronic tracking. While any sort of tracking may be suitable, such as bar codes, RF-ID, documents, etc., bar codes are preferred because they can be automatically read, may contain sufficient individual unit identifying information and security features to deter tampering, and are part of a relatively low cost infrastructure.

Thus, upon distribution of the container, a bar code 5 placed on the cylinder during manufacture or filling is read by an automated bar code reader 2, a deposit fee charged, and an information record transmitted by an automated control 1 to a database 6. In some cases, a purchaser may be identified in the record, but this may not be necessary. Advantageously, the content of the encoded refrigerant transport container 7 is coded, as well as a unique identifier provided.

Upon return to a recycling center, which may be the same or different from the point of sale or distribution, the bar code 5 is read by an automated bar code reader 2 at such time when the recycling of the container is committed. For example, as it is being inserted into the recycling chamber itself. The bar code 5 is then analyzed to determine the type of refrigerant, which may impact the refrigerant capture phase of operations. In a bulk recycling system, e.g., the first embodiment, the automated bar code reader 2 may be used to ensure that refrigerant types are not mixed, and/or that prohibited types are not included. Once the encoded refrigerant transport container 7 is accepted for recycling, the original database record may be updated, and the deposit released. In one case, the tracking of deposits is automated, and so long as the encoded refrigerant transport container 7 is recycled, the owner of the deposit is credited. On another case, the presenter of the encoded refrigerant transport container 7 is credited, with perhaps a flag in the database record to indicate potential theft or fraud.

The refrigerant withdrawn from the containers, as well as the scrap steel and brass fittings, may have some value, and therefore there is potential for subsidy of the recycling operations from that revenue source. However, more typically, the recycling operation is funded by, for example, unredeemed deposits, and payments made by distributors or users. For example, a recycling fee may be charged or implied at the time of purchase or distribution of the container.

Therefore, the present invention provides various embodiments of systems and methods for recycling materials from non-reusable refrigerant transport vessels, and alleviate what has been deemed a potentially significant problem.

It is therefore an object of the invention to provide a system and method for recycling no-reusable refrigerant transport containers, comprising receiving at least one intact refrigerant transport container into a chamber, evacuating non-condensing gasses from the chamber, puncturing the intact refrigerant transport container to release residual refrigerant therein, removing and compressing the residual refrigerant, and shredding and/or compacting the refrigerant transport container.

It is a further object of the invention to provide a system and method for implementing a refrigerant transport container deposit program, comprising encoding a refrigerant transport container prior to use and imposing a deposit thereon, receiving a spent refrigerant transport container at a recycling facility, releasing the deposit, automatically removing residual refrigerant from the refrigerant transport container, and recycling the refrigerant transport container materials.

These and other objects will become apparent. For a full understanding of the present invention, reference should now be made to the following detailed description of the preferred embodiments of the invention as illustrated in the accompanying drawings.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
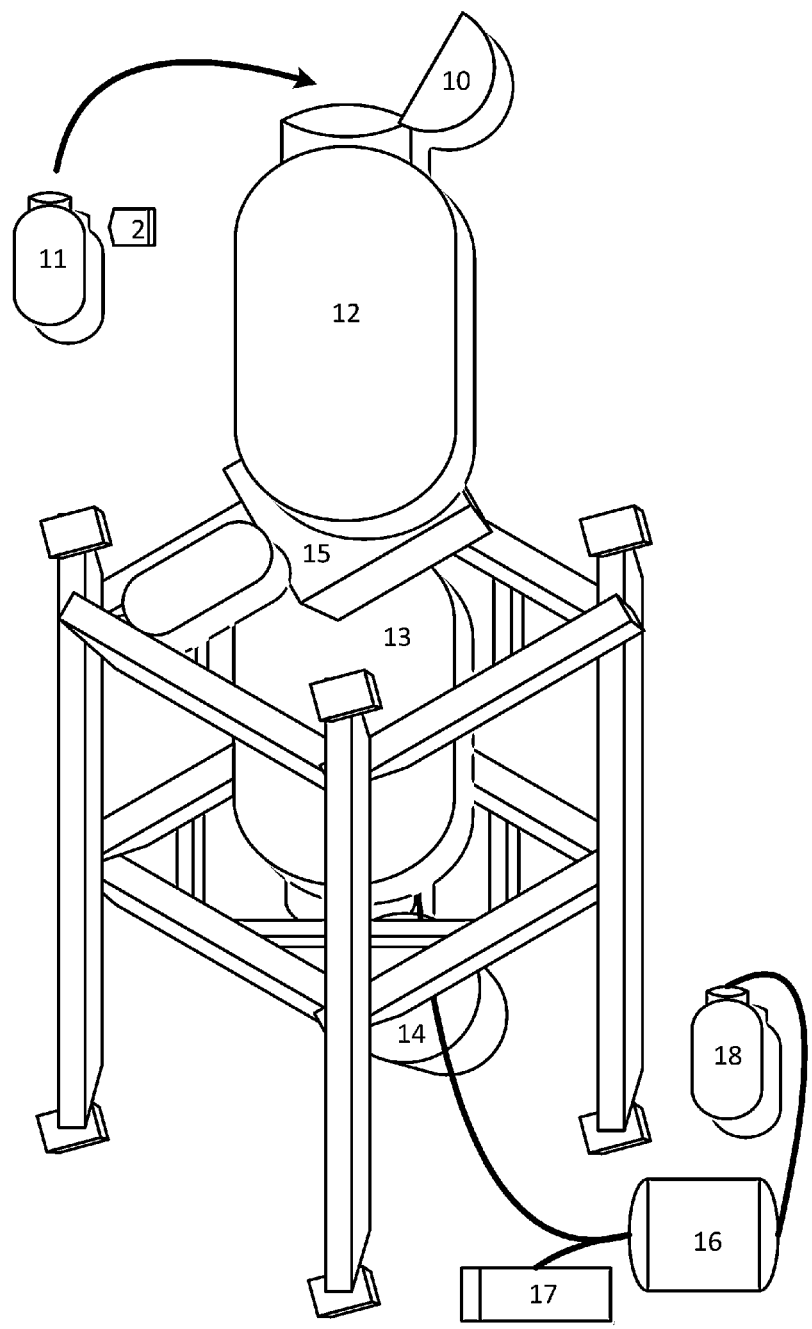
FIG. 1 shows a mechanical structure of a system according to the first embodiment of the invention.
Figure 2:
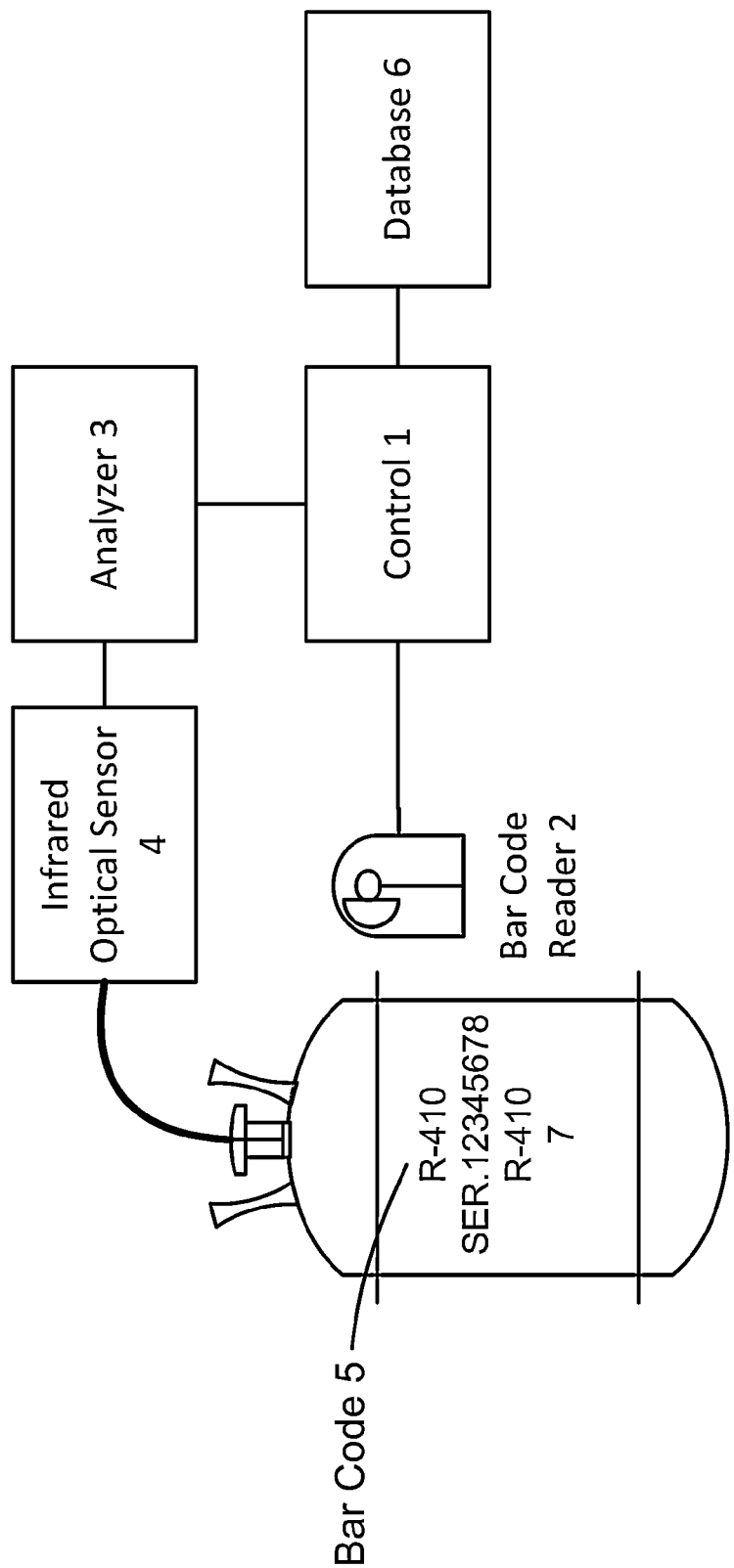
FIG. 2 shows a schematic diagram of a system according to the present invention.

As shown in FIG. 1, an upper door 10 is provided for insertion of the containers for recycling. After one or more containers 11 are inserted, the door 10 is clamped shut. As discussed above, but not shown in FIG. 1, the containers 11 may be coded, such as the encoded refrigerant transport container 7 shown in FIG. 2, for example color coded or bar coded with bar code 5, and an automated bar code reader 2 provided to determine the encoded refrigerant transport container 7 type. A block may be provided to prevent insertion of containers of a wrong or inappropriate type. The coding may be used to determine a destination of the refrigerant once reclaimed. The coding may also be used in conjunction with a container deposit program.

The chambers 12, 13, once sealed, are then evacuated with a vacuum pump 14. Since the refrigerant containers are still intact, this evacuation may be to atmosphere, and is intended to eliminate non-condensing gases from the chamber(s) 12, 13.

After the chambers 12, 13 are evacuated, for example to a 30 inch Hg vacuum, by the vacuum pump 14, the shredder 15 below the top chamber is then operated, which initially punctures a container 10 to release refrigerant, and then proceeds to shred the steel container it its entirety, allowing the shreds to drop into the lower chamber 13. In general, the shredder 15 will operate on one container 11 at a time, sequentially shredding the various containers in the chamber 12 until complete.

After the chambers 12, 13 are evacuated of non-condensing gasses, and before the chambers 12, 13 again opened to the atmosphere, a compressor 16 is operated to remove refrigerant from the sealed chambers 12, 13. This compressor 16 is operated to remove traces of refrigerant, for example to a vacuum of 29 inches of Hg.

During operation, an analyzer 17, e.g., an infrared analyzer, is operated to detect the type, and optionally purity of gas in the chambers 12, 13. If the gas is of a known type, and pure, it can be pooled with prior recovered refrigerant of the same type. Otherwise, it may be collected in a separate container 18 for later reclamation or proper disposal.

After the last container 11 in the chamber is shredded, and the residual refrigerant recovered, the upper chamber 12 may be reopened, and additional containers 11 inserted for processing. The lower chamber 13 may also be opened to remove shredded sheet and fittings, though this need not be done as often.

There has thus been shown and described novel refrigerant recovery and transport container recycling systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for recycling a container, comprising:
   receiving an intact container having contents into a chamber;
   reading an electronically readable code printed on the intact container;
   retrieving information from a database corresponding to the code;
   selectively processing the intact container in dependence on the retrieved information;
   puncturing the at least one intact container to release the contents;
   removing the contents from the chamber, while maintaining the punctured container in the chamber; and
   shredding and/or compacting the punctured container.

2. The method according to claim 1, wherein the intact container comprises an intact refrigerant transport container, and the contents comprises residual refrigerant in the intact refrigerant transport container.

3. The method according to claim 2, further comprising automatically determining a type of refrigerant content of the intact refrigerant transport container by at least reading a machine readable code associated with the intact refrigerant transport container.

4. The method according to claim 3, further comprising compressing and storing the residual refrigerant released into the chamber in a storage vessel in dependence on a type of residual refrigerant released.

5. The method according to claim 2, further comprising determining a type of refrigerant composition in the intact refrigerant transport container by performing a refrigerant composition analysis of the residual refrigerant.

6. The method according to claim 5, further comprising compressing and storing the residual refrigerant released into the chamber in a storage vessel in dependence on a type of refrigerant released.

7. The method according to claim 1, further comprising:
   encoding a container prior to use;
   imposing a deposit on the container;
   receiving an encoded container at a recycling facility;
   releasing the imposed deposit; and
   shredding and/or compacting the container after the imposed deposit is released.

8. The method according to claim 1, wherein the shredding and/or compacting is performed with a shredder and/or compactor, wherein the shredder and/or compactor is isolated from the chamber during the puncturing and removing steps.

9. A system for recycling a container, comprising:
- an electronically code reader configured to read a code printed on an intact container having contents;
- an automated control, configured to communicate with a database to retrieve information corresponding to the code, and to control processing the intact container in dependence on the retrieved information;
- an element configured to puncture the intact container to release the contents into a chamber, while maintaining the punctured container in the chamber; and
- a shredder and/or compactor configured to shred and/or compact the punctured container, wherein the released contents and the shredded and/or compacted container are stored separately.

10. The system according to claim 9, wherein the intact container comprises an intact refrigerant transport container, and the contents comprises residual refrigerant in the intact refrigerant transport container.

11. The system according to claim 10, wherein the automated control is further configured to automatically determine a type of refrigerant content of the intact refrigerant transport container by at least reading a machine readable code associated with the intact refrigerant transport container.

12. The system according to claim 11, further comprising a compressor configured to compress the residual refrigerant released into the chamber for storage in one of a plurality of storage vessels, selected in dependence on a type of residual refrigerant released.

13. The system according to claim 10, further comprising a refrigerant composition analyzer configured to determine a type of refrigerant composition in the intact refrigerant transport container by performing a refrigerant composition analysis of the residual refrigerant.

14. The system according to claim 13, further comprising a compressor configured to compress the residual refrigerant released into the chamber for storage in one of a plurality of storage vessels, selected in dependence on a type of residual refrigerant released.

15. The system according to claim 9, wherein the shredder and/or compactor is isolated from the chamber during the puncturing.

16. The system according to claim 10,
- wherein the chamber has a seal;
- further comprising a vacuum pump adapted to evacuate non-condensing gasses from the chamber; and
- a compressor configured to remove and compress the released residual refrigerant from the chamber.

17. The system according to claim 9, further comprising:
- an encoding associated with the intact container, having contents;
- a database storing a record relating to the encoded intact container, said database record relating at least to a deposit charged for the encoded intact container; and
- a control, configured to update the database record after the encoded intact container is committed to shredding and/or compacting.

18. The system according to claim 9, wherein the chamber is located above a storage area for shredded and/or compacted containers.

19. A method for implementing a container deposit program, comprising:
- encoding a container prior to use;
- imposing a deposit on the encoded container;
- receiving an encoded container at a recycling facility;
- releasing the imposed deposit upon commitment to shredding and/or compacting of the container;
- automatically removing residual contents from the container; and
- recycling materials from the encoded container separate from the residual contents.

20. The method according to claim 19, wherein:
- the container comprises an encoded refrigerant transport container, having a residual refrigerant content;
- the deposit is recorded in a database storing a record relating to the encoded refrigerant transport container; and
- the recycling facility comprises a recycling machine, configured to automatically remove residual refrigerant from the encoded refrigerant transport container with a vacuum pump and the compress the removed residual refrigerant to a form liquid, which is selectively stored in a storage vessel in dependence on its composition.

* * * * *

UNITED STATES PATENT AND TRADEMARK OFFICE
CERTIFICATE OF CORRECTION

| | | |
|---|---|---|
| PATENT NO. | : 8,544,287 B1 | |
| APPLICATION NO. | : 13/532929 | |
| DATED | : October 1, 2013 | |
| INVENTOR(S) | : Kevin Zugibe | |

It is certified that error appears in the above-identified patent and that said Letters Patent is hereby corrected as shown below:

On the Title Page: Item (75) Inventor should read:

-- Kevin Zugibe --

Signed and Sealed this
Third Day of December, 2013

Margaret A. Focarino
*Commissioner for Patents of the United States Patent and Trademark Office*